(12) United States Patent
Englert et al.

(10) Patent No.: US 8,424,448 B2
(45) Date of Patent: Apr. 23, 2013

(54) BEVERAGE DISPENSER

(75) Inventors: Robert S. Englert, Jamesville, NY (US); M. Bianca Leigh, Syracuse, NY (US); Carlos A. Suarez, Solvay, NY (US)

(73) Assignee: Ram Industrial Design, Inc., Syracuse, NY (US)

( * ) Notice: Subject to any disclaimer, the term of this patent is extended or adjusted under 35 U.S.C. 154(b) by 527 days.

(21) Appl. No.: 12/721,816

(22) Filed: Mar. 11, 2010

(65) Prior Publication Data

US 2011/0219956 A1    Sep. 15, 2011

(51) Int. Cl.
*A47G 19/14* (2006.01)
*A47J 31/18* (2006.01)

(52) U.S. Cl.
USPC ............... 99/317; 99/318; 99/319; 99/321; 99/322; 99/323; 99/323.3; 219/432

(58) Field of Classification Search ............ 99/317, 99/318, 319, 321, 322, 323, 323.3; 219/432
See application file for complete search history.

(56) References Cited

U.S. PATENT DOCUMENTS

| | | | |
|---|---|---|---|
| 3,998,351 A | 12/1976 | Smith et al. | |
| 4,164,645 A * | 8/1979 | Dogliotti | 219/447.1 |
| 4,772,777 A | 9/1988 | Weller et al. | |
| 4,864,921 A | 9/1989 | Ross | |
| 5,609,092 A | 3/1997 | Chen | |
| 5,787,797 A | 8/1998 | Ariki | |
| 6,072,161 A | 6/2000 | Stein | |
| 6,177,655 B1 * | 1/2001 | Toman | 219/432 |
| 6,314,866 B1 * | 11/2001 | Melton | 99/322 |
| 6,403,928 B1 | 6/2002 | Ford | |
| 6,513,683 B1 | 2/2003 | Kull | |
| 6,520,070 B1 * | 2/2003 | Heczko | 99/323.3 |
| D513,681 S | 1/2006 | Picozza et al. | |
| 7,032,506 B2 | 4/2006 | Scott et al. | |
| 7,073,428 B2 | 7/2006 | Chung et al. | |
| D536,205 S | 2/2007 | Jensen et al. | |
| 7,279,660 B2 * | 10/2007 | Long et al. | 219/441 |
| 2002/0175158 A1 | 11/2002 | Sanoner et al. | |
| 2006/0071008 A1 * | 4/2006 | Sadlier | 220/713 |
| 2008/0060526 A1 | 3/2008 | Gilbert | |
| 2008/0078824 A1 * | 4/2008 | Spriegel et al. | 229/403 |
| 2009/0056557 A1 | 3/2009 | Lin | |
| 2010/0263549 A1 * | 10/2010 | Lee | 99/319 |

* cited by examiner

*Primary Examiner* — Benjamin Layno
(74) *Attorney, Agent, or Firm* — Patrick J. Daugherty; Driggs, Hogg, Daugherty & Del Zoppo Co., LPA (57) ABSTRACT

A beverage apparatus has a portable liquid container having a ledge detail within a top open end; a removable infuser with an annular support flange; and a gasket about the infuser below the annular support flange, where in use the gasket forms a seal with the container ledge detail and the infuser body, and further spaces the infuser annular support flange from the container ledge detail to define a liquid access gap. At least one vertical channel is defined through the gasket to communicate liquid through the gasket between the liquid container and the liquid access gap. A support base has an opening to receive and hold a bottom end of the portable liquid container and a heating element to heat liquid within the portable container when the container bottom end is inserted within the opening.

16 Claims, 6 Drawing Sheets

BEVERAGE DISPENSER

FIELD OF THE INVENTION

The present invention relates to heating and preparing beverage liquids in an apparatus to facilitate consumption of a resulting beverage.

BACKGROUND

An herbal or medicinal tea is an infusion or decoction beverage produced by steeping in water the leaves, buds, bark, or roots ("tea matter") of one or more plants. A variety of plant materials may be utilized to generate a tea beverage; however, the term "tea" is often used to generically denote a beverage produced by steeping in freshly heated water the young leaves and leaf buds of the tea plant, *Camellia sinensis*. The practice of drinking tea is believed to have originated in China as long as 5000 years ago when dried *Camellia sinensis* leaves were accidentally combined with boiling water, resulting in drinking water with a rich brown coloring and a pleasing new flavor. Over time procedures and rituals for preparing and serving tea developed and improved, for example, wherein once prepared, the tea is poured from a steeping pot and divided into small, handle-less ceramic cups. Such tea ceremonies quickly gained popularity and spread far beyond China's borders. Tea has been embraced on a global level and is one of the most popular beverages in the world.

BRIEF SUMMARY

According to the present invention, a beverage apparatus is provided. A portable liquid container has a liquid containing body wall forming a bottom closed end and a ledge detail within a top open end. A removable infuser has a body wall defining liquid-admitting perforation apertures, a closed bottom end and a top end, the top end having a top surface and an annular support flange protruding outwardly away from the top surface. A gasket is disposed about the infuser below the annular support flange, where in use the gasket forms a liquid impervious seal with the container ledge detail and the infuser body, and further spaces the infuser annular support flange from the container ledge detail to define a liquid access gap between the infuser annular support flange and the container ledge detail when the infuser is positioned into the portable liquid container top open end. At least one vertical channel is defined through the gasket to communicate liquid through the gasket between the liquid container and the liquid access gap. A support base has a heating element and an internally oriented peripheral shoulder forming an opening to receive and hold a bottom end of the portable liquid container, the heating element to heat liquid within the portable container when the container bottom end is inserted within the internally oriented peripheral shoulder opening. Further, a switching means is provided in circuit communication with the heating element to actuate the heating element so that the container liquid will be heated to at least one specified temperature when the container bottom end is inserted to rest within the support base peripheral shoulder opening.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention and, therefore, should not be considered as limiting the scope of the invention. In the drawings, like numbering represents like elements.

DETAILED DESCRIPTION

Preparing a tea or other brewed beverage generally involves placing tea or other steeping matter in a pot or other container of heated water and steeping the tea matter within the heated water for a specified or desired time. For teas and some other brewing material, care is often taken to not exceed a specified brewing time, wherein the steeping material must be separated from the beverage in order to avoid bitter flavors or other deleterious taste effects caused by over steeping. Other brewing materials (for example, red bush or rooibos) may be steeped indefinitely without generating bitter flavors or other deleterious taste effects. The brewed beverage is commonly transferred from the brewing pot or other heating vessel into individual serving containers, for example poured from a pot and divided into smaller, handle-less ceramic cups in a "tea ceremony."

Tea and other brewed beverages may be prepared and enjoyed using a variety of methods and systems. Cast iron pots once used to boil water over open flames have been commonly replaced with stainless steel kettles heated on electric or gas stoves. Alternatively, kettles made of plastic, glass, or stainless steel and containing concealed electrical heating elements to heat water have also been developed. Tea bags, woven pouches containing loose tea or other brewing materials, are often placed inside a teapot, mug or cup so that hot water can infuse the tea bag, wherein once the tea has steeped, the teabags can be removed by using a spoon or by grasping a string tethered to an individual teabag.

The present invention provides a system and method for a combination tea kettle and travel mug that prepares and serves tea in the same single, portable travel mug or container wherein tea can be efficiently enjoyed on the go, without requiring separate heating pots and serving mugs. In some embodiments, the combination tea kettle and travel mug is designed to be visually attractive and offer user convenience features, for example including a tea infuser internal to a lid, the tea infuser configured so as to allow the use of bagged teas or, when a removable mesh basket is placed within it, to also allow the use of loose teas. Combination tea kettle and travel mugs according to the present invention may also offer an independent and detachable heating base capable of heating water to any one of three different temperatures that may be selected according to the type of tea being brewed.

FIGS. 1 through 6 provide a variety of views of an embodiment of a combination tea kettle and travel mug beverage apparatus 10 according to the present invention. The apparatus 10 comprises a "travel mug" or portable liquid container 12 wherein a perimeter of a centric cross section 14 has a lesser dimension than a perimeter of an open top end 60 and also of a perimeter of a closed bottom end 24, said closed bottom end 24 being configured so as to maintain the portable liquid container 12 in a stable upright position when rested upon a generally horizontal surface, such as for example a countertop.

Figure 1:
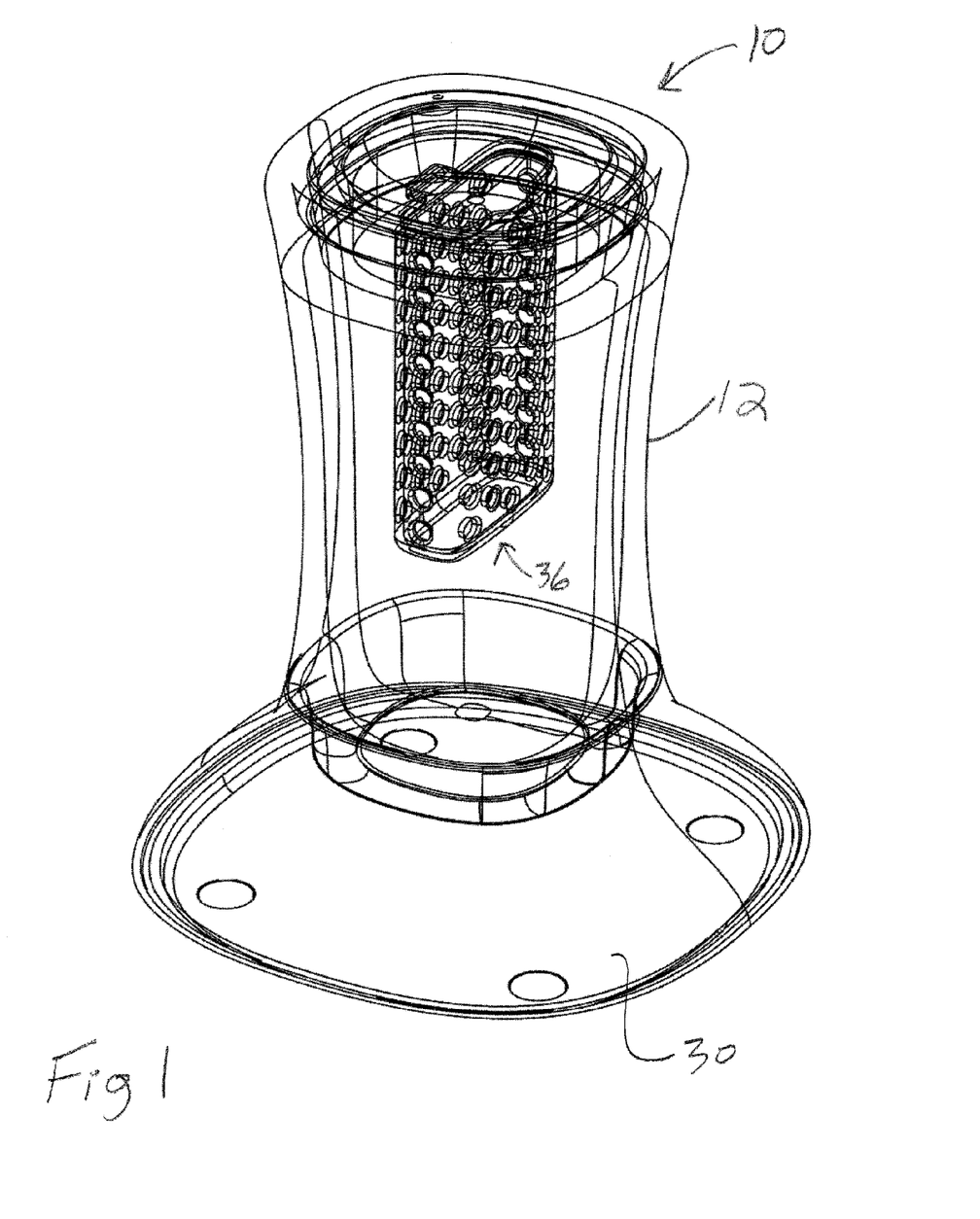
FIG. 1 provides an isometric perspective view of a combination tea kettle and travel mug beverage apparatus according to the present invention.
Figure 2:
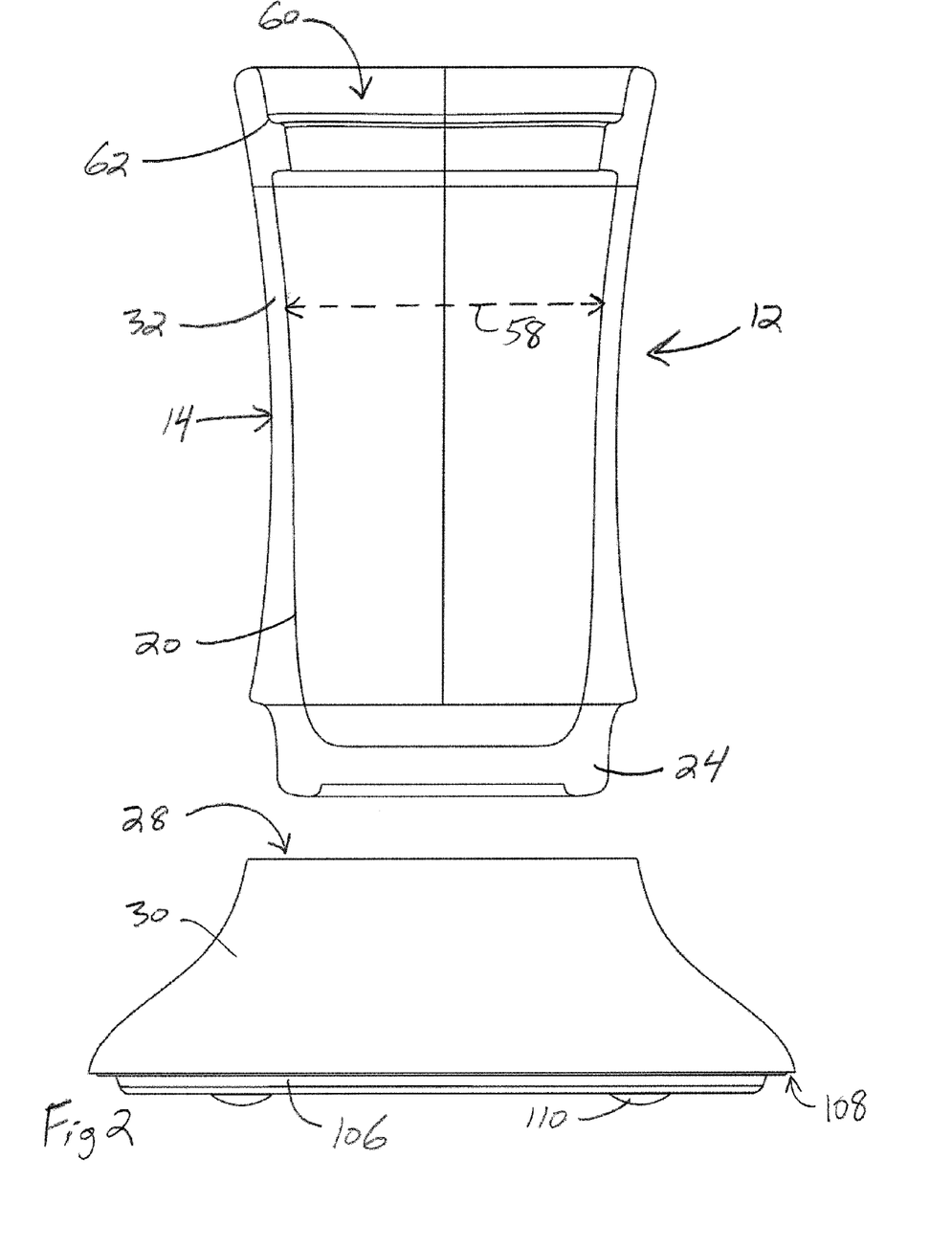
FIG. 2 provides a front view of the combination tea kettle and travel mug beverage apparatus of FIG. 1 with some elements omitted to facilitate viewing of remaining elements and with a container element shown removed from a base element.
Figure 3:
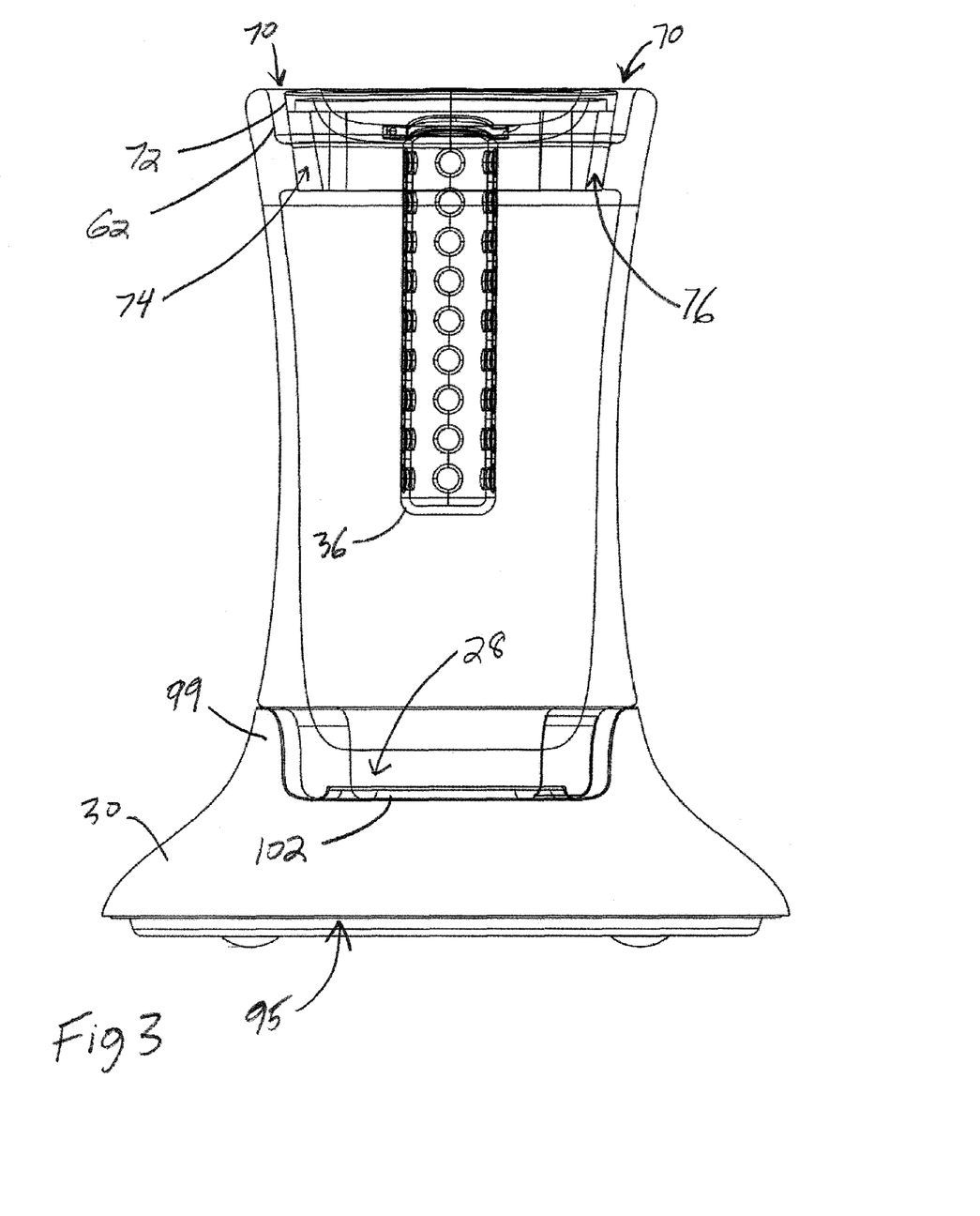
FIG. 3 provides another front view of the combination tea kettle and travel mug beverage apparatus of FIGS. 1 and 2, further illustrating an infuser element inserted into the container and with the container shown inserted into the base element.

The portable liquid container 12 has a central vessel 20 to hold within it hot or cold liquids, for example "redbush" or "rooibos," tea, coffee, soft drink, water or similar potables. Embodiments of the central vessel 20 may be formed of a slip cast ceramic material wherein internal surfaces are gloss glazed so as to prevent the absorption of liquid into its porous ceramic body, and other vessels 20 may be formed of plastic, metal, glass and other materials as will be appreciated by one skilled in the art.

A sleeve 32 encircles a greater portion of the vessel 20 whereby the vessel may be comfortably gripped by a human hand, and whereby heat transferred through the vessel walls from hot liquid contained therein will be isolated from said hand. Embodiments of the sleeve 32 may be formed of an elastomeric material, such as silicone or other suitable material. The sleeve 32 is configured to interrupt heat conduction, and may be formed of any material that is a poor heat conductor, or wherein an air-gap or other impedance to heat conduction is provided, and alternatives may be formed from cardboard, plastic, rubber, metal, glass and other materials as will be appreciated by one skilled in the art.

Figure 4A:
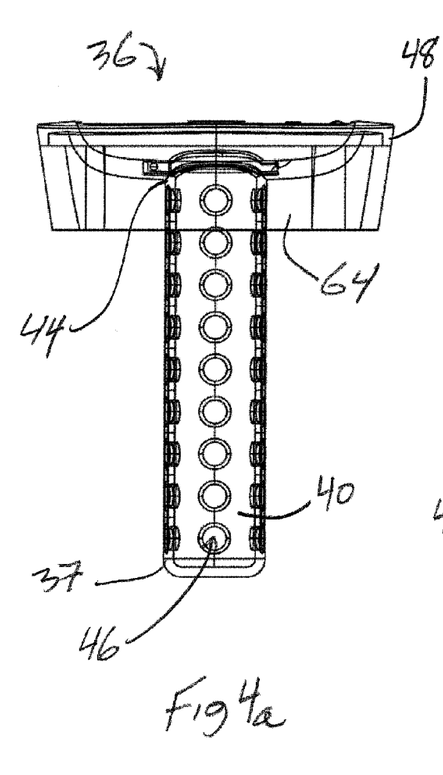
FIGS. 4a and 4b show side and front views of an infuser element according to the present invention.
Figure 4B:
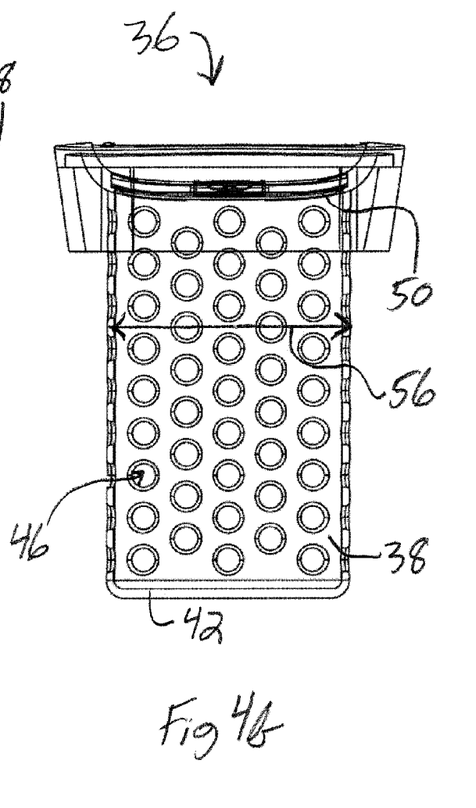

A tea or other brewing or steeping matter infuser 36 is provided with a body 37 formed of major opposing sides 38 and smaller, minor opposing sides 40, each having a plurality of perforations 46; a closed bottom end 42; and an open top end 44. The perforations 46 are provided to hold steeping objects, such as a tea bag, within the body 37 and allow beverage fluid to flow in and out, and thus infuse the flowing liquid with material from the steeping object(s). The infuser 36 has an annular support flange 48 attached to or formed by the infuser body 37 and protruding outwardly away from the top edge 50 of the top end 44 of said opposing sides 38, 40.

The infuser 36 is adapted to be inserted into the top open end 60 of the portable liquid container 12 vessel 20, the infuser body 37 having a largest cross sectional dimension 56 across the major opposing walls 38 smaller than an interior opening diameter 58 of an encompassing portion of the interior of the vessel 20, the annular support flange 48 having an outside perimeter dimension smaller than an inside perimeter of the top end 60 of the portable liquid container 12. When the infuser 36 is received within the container 12, the support flange 48 is capable of resting atop a ledge detail 62 formed within said portable liquid container top end 60 through an intervening gasket 64, the support flange 48/gasket 64 assembly functioning as a lid for the portable liquid container 12.

In some embodiments, the infuser body 37 is formed of an injection molded thermoplastic material, and the gasket 64 of cork or other compressible material. Alternative materials will be apparent to one skilled in the art. The gasket 64 is adapted to fill space between mating surfaces of the portable liquid container 12 and the infuser 36 and includes a centrally located opening having a perimeter concentric with an external perimeter of the infuser body 37, the gasket 64 extending downwardly adjacent the sides 38, 40 and for a portion of the length of said infuser 36 wherein a top surface of the gasket 64 abuts an underside of the infuser support flange 48. In use, the gasket 64 may remain slightly compressed between the infuser 36 and internal side walls of the portable liquid container 12 when the infuser 36 is received within the portable liquid container 12, thereby forming a seal whereas liquid cannot pass through the sealed region.

Figure 5:
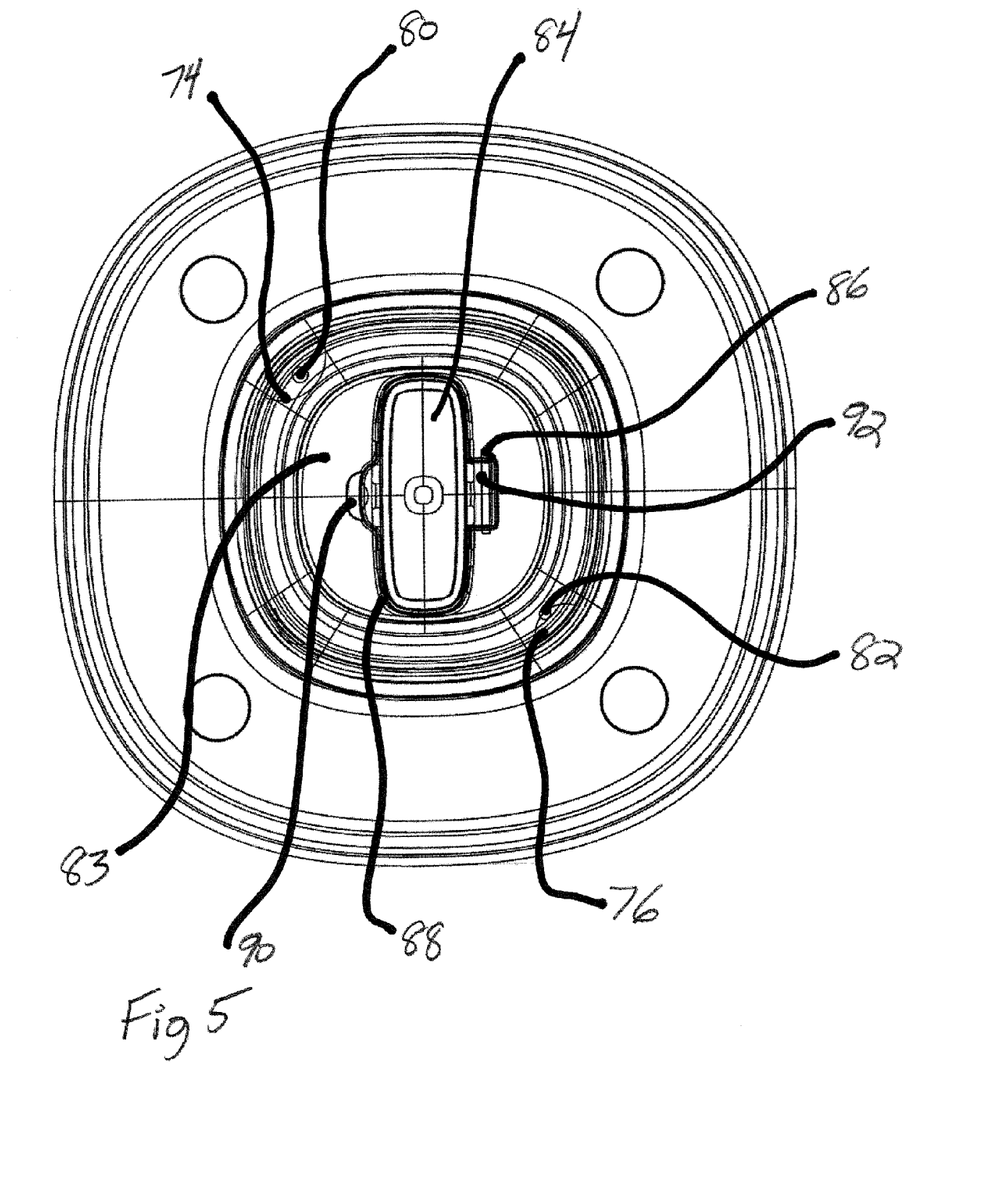
FIG. 5 provides a top view of the combination tea kettle and travel mug beverage apparatus of FIGS. 1 and 3.

The gasket 64 is further adapted to allow a controlled amount of liquid to flow past the seal in order to allow a user to drink fluid contained within the vessel 20. A liquid access gap 70 is defined by spacing between an outside perimeter edge 72 of the infuser annular support flange 48 and the container ledge detail 62 when the infuser 36 is positioned into the portable liquid container top open end 70. The present embodiment of the gasket 64, flange 48 and open end ledge detail 62 is generally square in shape, and the gasket 64 has a first semi-circular vertical channel 74 at one of its corners and a second semi-circular vertical channel 76 at an opposing corner, the second said channel 76 being 180 degrees removed from the first channel 74, and wherein the first said channel 74 is slightly larger in diametric size than the second said channel 76 whereby liquid may pass through either one of said channels 74, 76 so as to be accessed for drinking, for example by passing fluid through a one of the channels 74, 76 while allowing atmospheric air to enter or exit the vessel 20 through the other of the channels 74, 76 to optimize fluid movement in or out of the vessel 20. A user may thus rest their lips upon the top and/or outer surfaces of the infuser annular support flange 48 and the container ledge detail 62 and drink beverage fluid conveyed into the liquid access gap 70 from the vessel 20 by the channels 74, 76.

A first domed protrusion 80 and a second domed protrusion 82 may each be provided to project upwardly away from the top surface of the infuser support flange 48, said first domed protrusion 80 and said second domed protrusion 82 each located proximate a respective outside corner of the infuser support flange 36 and being 180 degrees removed from the other and of different or distinctive diametric sizes, shapes, appearance, etc., the larger first domed protrusion 80 to be aligned with the larger first gasket channel 74, and the smaller second domed protrusion 82 aligned with the smaller second gasket channel 76. The protrusions 80, 82 thereby serve to indicate the respective locations of the infuser gasket channels 74, 76 located therebelow.

The top surface 83 of the infuser 36 further comprises a door 84 attached to hinges 86 in the infuser 36, wherein the door 84 is capable of resting atop a door ledge 88 formed as a recess in the top surface 83, the internal perimeter of said door ledge 88 defined by internal surfaces of the infuser 36, where in use the door 84 will compressively hold a tea bag tether in place while the tea bag is suspended within the tea infuser body 37 and said door 84 is at rest in a closed position upon the door ledge 88. The door 84 further has a finger grip 90 that projects outwardly away from the door side opposite the door hinge 92 whereby said finger grip 90 may be utilized to open or close said door. Thus, a tea bag within the infuser body 37 steeping in fluid within the vessel 20 may be easily removed through the door 84 to terminate steeping and avoid bitter flavor generation. The door 84 and the infuser 36 may be formed of an injection molded thermoplastic material, though other materials will be apparent to one skilled in the art.

As will be appreciated by one skilled in the art, the infuser 36 may also accept a reusable fine mesh screen filter insert, for example formed of stainless steel or a gold plated material, the filter insert adapted to fit within the tea infuser body 37 and having an outside perimeter smaller than an inside perimeter of the infuser body 37. Said filter insert may thus be received within said infuser body 37 and loose tea or other steeping material may be contained during brewing or steeping, and whereas the filter insert may be removed from said infuser 36, and thus the loose brewing material from the fluid within the vessel 20 thereby terminating further tea or beverage brewing, and further to enable easy cleaning and removal of loose matter from the vessel 20.

Figure 6:
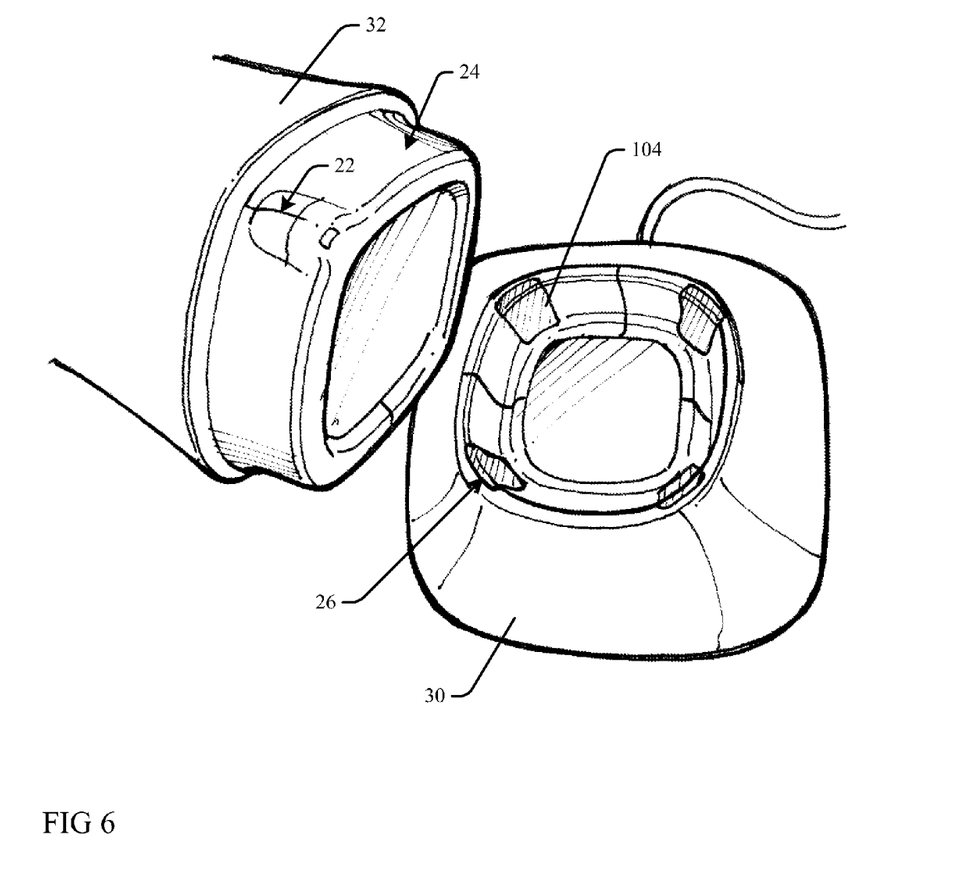
FIG. 6 provides a partial side view of a container element and a top view of a base element according to the present invention.

The support base 30 comprises a hollow body having opposing sides, an open top end 28, and an open bottom end 95, wherein a perimeter of the open bottom end 95 is larger than a perimeter of the open top end 28 so as to maximize stability when the base 30 is rested upon a generally horizontal surface. In some embodiments, the hollow body of the base 30 is formed of slip cast ceramic material, though other materials may be used. The hollow body has an internally protruding peripheral shoulder 99 proximate its vertical center and adapted to mate with or otherwise accept the bottom end 24 of the portable liquid container 12; the hollow body peripheral shoulder 99 having an inside perimeter larger than the outside perimeter of said portable liquid container bottom end 24.

A heater element 102 is provided within the hollow body 94 adjacent the internally protruding peripheral shoulder portion 99 to convey heat to the container bottom end or base area 24 and thereby to heat fluid contained within the vessel 20 when the container bottom end 24 is inserted into the opening 28 of the support base 30. In some embodiments, the support base 30 comprises an electric resistance heater assembly wherein the heater element 102 is a conductive heater plate secured in a horizontal position within a hollow body 94, the heater plate heater element 102 defining a downwardly facing open space within the periphery 99 of the open body 94, and wherein the open space within the hollow body 94 houses within it components of the electric resistance heater assembly.

The present invention thus enables making and enjoying tea on the go a fashion more versatile and efficient than otherwise possible with traditional travel mugs and tea kettles. The free-standing support base 30 with a concealed electric resistance heater assembly comprising the heater element 102 enables heating water contained in a portable travel mug style of container 12 when the bottom 24 of the travel mug container 12 is nested within the base opening 28, and thus tea may be brewed (or another heated potable prepared) directly in the travel mug container 12 without the need for a tea pot or other second apparatus for heating water. The travel mug container 12 may then be removed from the base 30 and a potable within consumed directly therefrom, eliminating the need to transfer heated liquids between kettle and separate cup and thereby preventing scalding or other hazards to a user associated with such transfers.

The present invention also offers resource efficiencies over conventional kettle and cup brewing processes. For example, energy is conserved by removing a requirement to heat both of two separate brewing and drinking containers, which is typically necessary to ensure a comfortable drinking temperature for an adequate drinking period in a drinking container. Further, only the amount of water actually provided for consumption within the container vessel 20 is heated, with no energy or water wasted in heating unused amounts of water that may be left behind in a separate kettle.

Selecting sleeve 32 materials and configurations to provide insulating properties about the vessel 20 may further enhance container 12 efficiencies and performance. In one embodiment, the sleeve 32 is formed from an elastomeric material disposed about a ceramic vessel 20 material, the elastomeric material reducing heat loss from liquid contained within the vessel 20, thereby extending the amount of time that a heated beverage within the vessel 20 remains at a desired, warmed drinking temperature, and also protecting a user's hands from direct contact with radiant heat from the vessel 20. Rubber-like and deformable material properties of an elastomeric sleeve 32 may also provide for improved gripping comfort for a user's hands about the sleeve 32, and for a no-slip frictional and tactile gripping surface to enhance a secure grip on the container 12 during transportation and drinking, the sleeve 32 properties thereby helping a user to avoid drops or spills that may scald a user.

In another aspect, the present invention may provide a user with an opportunity to select between different and distinct brewing temperatures, for example for selecting between predetermined temperatures appropriate to different types of tea or beverage being brewed. Embodiments may further enable a user to make certain that a heating or brewing process will cease when a desired brewing temperature is reached, thereby enhancing a tea drinking experience by assuring that an optimal tea flavor may be enjoyed. Accordingly, electrical switching means may be disposed within the support base 30, said switching means coupled with other components of the electrical circuitry comprising the electric resistance heater assembly (for example including among them electrical lead wires) in order to allow user control or selection of brewing heat and temperatures imparted to the container vessel 20 fluid by the heating element 102.

In some embodiments, the switching means includes a plurality of electrical switches 26 each dedicated to an electrical circuit controlling a defined function. In the present example, each one of four switches 26 occupies a corner of the generally square support base opening 28 and is adapted to be selectively actuated by the portable liquid container bottom end switch engaging means 22 when said portable liquid container is inserted to rest within the support base 30. In the present example, a single rounded protrusion 22 projects outwardly from an exterior of a side wall of the vessel 20, said protrusion 22 extending over a portion of a vertical length of the vessel 20 and terminating proximate an edge of the closed bottom end 24 of said vessel 20. The protrusion 22 is provided to actuate a one of the switches 26 when the container bottom 24 is inserted to rest within the open end 28 of the support base 30.

Actuation may comprise a frictional contact of the protrusion 22 with a one of the switches 22. In one embodiment, pressure exerted by the single rounded protrusion 22 upon a pushbutton switch 26 actuates a heating element 102 engagement, for example wherein the push button switch 26 is accessible through an aperture penetrating the internally protruding peripheral shoulder 99 therein. In another embodiment, proximity for an electrical field engagement by a respective switch 26 with an electromagnetic switch engaging means 22 actuates a heating element 102 process. Still other switch 26/switch engaging means 22 configuration will be apparent to one skilled in the art.

In some embodiments, actuation of a first switch 26 activates a heating process required to raise the temperature of liquid held within the portable liquid container vessel 20 to a first defined level, such as for example a 140 degrees Fahrenheit brewing temperature desired or specified for brewing oolong tea held within the infuser body 37; and wherein actuation of a second, different switch 26 activates a heating process required to raise the temperature of said container vessel 20 liquid to a second, higher defined temperature level, such as for example 160 degrees Fahrenheit for brewing green tea. Actuation of a third one of the switches 26 may activate a heating process required to raise the temperature of said container vessel 20 liquid to a third higher specified or desired temperature level, such as for example to the boiling point temperature of 212 degrees Fahrenheit for brewing black tea. Actuation of the fourth switch 26 may deactivate the heating element 102 until the portable liquid container 12 is removed from the heat generating support base 30, rotated and then reinserted into the support base 30 so that the switch engaging means 22 may engage another of the switches 26 at its respective position within the base 30.

In one embodiment, each switch 26 is a pressure switch 26 covered by an elastomeric boot 104 compressively held between a respective pushbutton switch 26 and the support base 30. The elastomeric boots 104 are formed of silicone or other suitable material and span an entire front surface and actuator of each said push button switch 26, the elastomeric boots 104 adapted to occupy an aperture defined in the external surface of the base 30 through which each said switch 26 is accessible. The elastomeric boot 104 remains flexible over its externally exposed surface and compressed about its periphery, thereby forming a seal and whereby pressure applied to each said elastomeric boot 104 will be transferred to a push button switch 26 actuator residing beneath it. The elastomeric boots 104 may be formed as a set of separate components each adapted to cover a single push button switch 26 or alternatively as a single component covering all four push button switches.

In yet another embodiment of the invention, the heating element 102 switching means is a four-deck rotary switch including a cylindrical actuation shaft with a one flatted region extending over a portion of its length. The four-deck rotary switch may be disposed within a downwardly facing open space of the support base 30 with a cylindrical actuation shaft extending through an aperture piercing a side wall of said support base 30, the cylindrical actuation shaft adapted to accept mechanical attachment of a control knob. A control knob may include an aperture concentric with a flatted end of said cylindrical actuation shaft whereat rotation of said control knob rotates said cylindrical actuation shaft accordingly, and wherein rotation of said control knob to any one of the four positions either activates the heating element 102 to raise the temperature of the liquid held within the portable liquid container vessel 20 to one of the first, second or third defined temperature levels described, or deactivates all heating processes in an "off" position.

In some embodiments, indication means are presented by the support base as to the function of a respective selected switch. For example, a visual indication means may be provided on the external surface of the base 30, such as a plurality of graphic symbols, each one graphic symbol aligned with a one push button switch and each one graphic symbol being proximate a one top corner of said support base wherein each said graphic symbol represents the function of its correspondent push button switch and serves to guide selection of a desired or specified tea brewing temperature or to stop heating of the vessel 20.

In another aspect, a brewing assembly according to the present invention may provide one or more sensors capable of determining when a specific liquid temperature has been reached, the sensors in circuit communication with the heating element 102 and/or switch 26 or control structures associated therewith. Accordingly, said sensor(s) may signal through a circuit communication that power is to be interrupted to the heating element 102 to deactivate a heating process when a desired or specified temperature is attained by the vessel 20 fluid.

A bottom closure plate 106 may be removably attached to the bottom of the support base 30. In some embodiments, the closure plate 106 is formed of epoxy powder coated cold rolled steel; other suitable materials will be appreciated by one skilled in the art. The closure plate 106 may be adapted to fit within a recess 108 formed in the bottom surface of the support base sides, the bottom surface of said closure plate 106 resting flush with or slightly inset from a bottom surface of said support base 30 sides. The closure plate 106 may also be formed to include a plurality of domed feet 110 whereupon the support base 30 will be supported when said support base 30 rests atop a generally horizontal surface, such as for example a countertop.

A visual indication means may also be provided to inform a user that a heating mode is operational or when a specified or desired temperature level has been achieved by the vessel 20 fluid. For example, a light source such as one or more super-bright light emitting diodes (LEDs) or a fluorescent lamp may be disposed within a downwardly facing open space of the support base 30 and coupled with electrical circuitry in communication with the heater element 102 whereby said light source will be illuminated whenever any heating mode is operational or when a specified or desired temperature level has been achieved by the vessel 20 fluid. In some embodiments, the support base closure plate 106 is suitably adapted to allow light emitted from said light source to escape whereby a glow may be seen radiating from beneath the support base 30, thereby indicating that a heating mode is active or the specified or desired temperature achieved.

The foregoing descriptions of various aspects and embodiments of the invention have been presented for purposes of illustration and description only. They are not intended to be exhaustive or to limit the invention to the precise form disclosed and, obviously, many modifications and variations are possible. For example, changes in type and kind of a container heat source component or changes in size and/or configuration of any or all of the invention components may not alter the spirit and intent of the invention described. Modifications and variations that may be apparent to a person skilled in the art are intended to be included within the scope of the invention as defined by the accompanying claims.

What is claimed is:

1. A beverage apparatus, comprising:
    a portable liquid container having a liquid containing body wall forming a bottom closed end and a ledge detail within a top open end and a switch engaging means;
    a removeable infuser having a body wall defining liquid-admitting perforation apertures, a closed bottom end and a top end, the top end having a top surface and an annular support flange protruding outwardly away from the top surface;
    a gasket disposed about the infuser below the annular support flange, where in use the gasket forms a liquid impervious seal with the container ledge detail and the infuser body and further spaces the infuser annular support flange from the container ledge detail to define a liquid access gap between the infuser annular support flange and the container ledge detail when the infuser is positioned into the portable liquid container top open end;
    at least one vertical channel defined through the gasket to communicate liquid through the gasket between the liquid container and the liquid access gap;
    a support base having a heating element and an internally oriented peripheral shoulder forming an opening to receive and hold a bottom end of the portable liquid container, the heating element to heat liquid within the portable container when the container bottom end is inserted within the interally oriented peripheral shoulder opening; and a switching means in circuit communication with the heating element to actuate the heating element to heat the container liquid to at least one specified temperature when the container bottom end is inserted to rest within the support base peripheral shoulder opening;

wherein the switching means is located to engage the container switch engaging means when the container bottom end is inserted to rest within the support base peripheral shoulder opening, the engagement of the switch engaging means to actuate the heating element to heat the container liquid to the at least one specified temperature;

wherein the container switch engaging means is a protrusion projecting outwardly from an exterior of a side wall of the bottom of the portable liquid container, said protrusion extending over a portion of a vertical length of the exterior of the container and terminating proximate an edge of the liquid container closed bottom end; and wherein the switching means is at least one push button switch located on the support base peripheral shoulder to be actuated by pressure from the container switch engaging means protrusion when the portable liquid container bottom end is inserted to rest within the support base peripheral shoulder opening.

2. The beverage apparatus of claim 1, wherein the switching means is a manual switch having a plurality of selection positions to select between different at least one specified temperature values and actuate the heating element to heat the container liquid to a selected one of the different at least one specified temperature values.

3. The beverage apparatus of claim 1, further comprising:
a heating indication means to communicate to a user at least one of activation of the heating element to heat the container liquid and that the container liquid is at the at least one specified temperature.

4. The beverage apparatus of claim 1, wherein the at least one vertical channel defined through the gasket comprises:
a first semi-circular vertical channel having a first channel diametrical size; and
a second semi-circular vertical channel 180 degrees removed from the first channel relative to a central axis of the gasket, the second channel having a first channel diametrical size smaller than the first channel diametrical size.

5. The beverage apparatus of claim 4, wherein the infuser annular support flange further comprises:
a first protrusion projecting upwardly away from a top surface of the infuser support flange a first protrusion projection size, where in use the first protrusion is located above the gasket first semi-circular vertical channel to indicate a location of the first semi-circular vertical channel to a user; and
a second protrusion projecting upwardly away from the top surface of the infuser support flange a second protrusion projection size that is different from the first protrusion projection size and distinguishable by the user relative to the first protrusion, where in use the second protrusion is located above the gasket second semi-circular vertical channel to indicate a location of the second semi-circular vertical channel to the user.

6. The beverage apparatus of claim 1, further comprising:
a door aperture having a door ledge recess defined within the infuser top end;
a door having a finger grip projecting outwardly away from an opposite door hinge, the door hinge hingedly attached to the infuser top end to rest the door atop an internal perimeter of the door ledge recess and to compressively hold a tea bag tether in place while a tea bag is suspended within the infuser body when the door is at rest in a closed position; and
wherein the door finger grip is accessible to use by a user to open the door when the door is at rest in the closed position.

7. The beverage apparatus of claim 1, wherein the support base heating element is an electric resistance heater assembly including a conductive heater plate secured in a horizontal position within a hollow body adjacent an internally protruding peripheral shoulder portion of the support base open top end, the conductive heater plate to convey heat to the container liquid through the portable container body when a container bottom end is inserted within the peripheral shoulder portion of the support base open top end.

8. The beverage apparatus of claim 1, wherein the portable liquid container is generally cylindrical;
wherein the portable liquid container closed bottom end has a bottom surface and a bottom end perimeter; and
the portable liquid container further comprises a centric middle cross section disposed between the top end and the bottom end and having a perimeter that is less than the bottom end perimeter;
where in use the closed bottom end bottom surface and the bottom end perimeter maintain the generally cylindrical vessel in a stable upright position when said bottom surface is rested upon a generally horizontal surface.

9. The beverage apparatus of claim 1, wherein the portable liquid container is formed of a slip cast ceramic material.

10. The beverage apparatus of claim 9, wherein at least internal surfaces of the portable liquid container are gloss glazed to prevent an absorption of the contained liquid into a porous ceramic body of the portable liquid container.

11. The beverage apparatus of claim 10, further comprising:
an elastomeric sleeve encircling an exterior surface of the portable liquid container centric middle cross section, where in use heat transferred through the portable liquid container body wall from hot liquid contained therein is isolated from a hand disposed about the portable liquid container centric middle cross section.

12. The beverage apparatus of claim 11 wherein said elastomeric sleeve is formed of silicone.

13. A beverage apparatus, comprising:
a portable liquid container having a liquid containing body wall forming a bottom closed end and a ledge detail within a top open end and a switch engaging means;
a removeable infuser having a body wall defining liquid-admitting perforation apertures, a closed bottom end and a top end, the top end having a top surface and an annular support flange protruding outwardly away from the top surface;
a gasket disposed about the infuser below the annular support flange, where in use the gasket forms a liquid impervious seal with the container ledge detail and the infuser body and further spaces the infuser annular support flange from the container ledge detail to define a liquid access gap between the infuser annular support flange and the container ledge detail when the infuser is positioned into the portable liquid container top open end;

at least one vertical channel defined through the gasket to communicate liquid through the gasket between the liquid container and the liquid access gap;
a support base having a heating element and an internally oriented peripheral shoulder forming an opening to receive and hold a bottom end of the portable liquid container, the heating element to heat liquid within the portable container when the container bottom end is inserted within the interally oriented peripheral shoulder opening; and
a switching means in circuit communication with the heating element to actuate the heating element to heat the container liquid to at least one specified temperature when the container bottom end is inserted to rest within the support base peripheral shoulder opening;
wherein the switching means is located to engage the container switch engaging means when the container bottom end is inserted to rest within the support base peripheral shoulder opening, the engagement of the switch engaging means to actuate the heating element to heat the container liquid to the at least one specified temperature;
wherein the portable liquid container switch engaging means is a friction device on an exterior wall portion of the liquid container closed bottom end; and
wherein the switching means is at least one friction switch located on the support base peripheral shoulder to be actuated by frictional sliding engagement with the container switch engaging means friction device when the portable liquid container bottom end is inserted to rest within the support base peripheral shoulder opening.

14. A beverage apparatus, comprising:
a portable liquid container having a liquid containing body wall forming a bottom closed end and a ledge detail within a top open end and a switch engaging means;
a removeable infuser having a body wall defining liquid-admitting perforation apertures, a closed bottom end and a top end, the top end having a top surface and an annular support flange protruding outwardly away from the top surface;
a gasket disposed about the infuser below the annular support flange, where in use the gasket forms a liquid impervious seal with the container ledge detail and the infuser body and further spaces the infuser annular support flange from the container ledge detail to define a liquid access gap between the infuser annular support flange and the container ledge detail when the infuser is positioned into the portable liquid container top open end;
at least one vertical channel defined through the gasket to communicate liquid through the gasket between the liquid container and the liquid access gap;
a support base having a heating element and an internally oriented peripheral shoulder forming an opening to receive and hold a bottom end of the portable liquid container, the heating element to heat liquid within the portable container when the container bottom end is inserted within the interally oriented peripheral shoulder opening; and
a switching means in circuit communication with the heating element to actuate the heating element to heat the container liquid to at least one specified temperature when the container bottom end is inserted to rest within the support base peripheral shoulder opening;
wherein the switching means is located to engage the container switch engaging means when the container bottom end is inserted to rest within the support base peripheral shoulder opening, the engagement of the switch engaging means to actuate the heating element to heat the container liquid to the at least one specified temperature;
wherein the switching means is a plurality of switches, each of the plurality of switches located spaced from each other along the support base peripheral shoulder whereby only one at a time of the plurality of switches may be selectively engaged by a proximate engagement of the container switch engaging means when the portable liquid container bottom end is inserted to rest within the support base peripheral shoulder opening;
wherein actuation of a first switch of the plurality of switches by the proximate engagement with the portable liquid container switch engaging means actuates the heating element to heat the container liquid to a first specified temperature of the at least one specified temperatures; and
wherein actuation of a second switch of the plurality of switches by the proximate engagement with the portable liquid container switch engaging means actuates the heating element to heat the container liquid to a second specified temperature of the at least one specified temperatures, the second specified temperature being higher than the first specified temperature level.

15. A beverage apparatus, comprising:
a portable liquid container having a liquid containing body wall forming a bottom closed end and a ledge detail within a top open end and a switch engaging means;
a removeable infuser having a body wall defining liquid-admitting perforation apertures, a closed bottom end and a top end, the top end having a top surface and an annular support flange protruding outwardly away from the top surface;
a gasket disposed about the infuser below the annular support flange, where in use the gasket forms a liquid impervious seal with the container ledge detail and the infuser body and further spaces the infuser annular support flange from the container ledge detail to define a liquid access gap between the infuser annular support flange and the container ledge detail when the infuser is positioned into the portable liquid container top open end;
at least one vertical channel defined through the gasket to communicate liquid through the gasket between the liquid container and the liquid access gap;
a support base having a heating element and an internally oriented peripheral shoulder forming an opening to receive and hold a bottom end of the portable liquid container, the heating element to heat liquid within the portable container when the container bottom end is inserted within the interally oriented peripheral shoulder opening; and
a switching means in circuit communication with the heating element to actuate the heating element to heat the container liquid to at least one specified temperature when the container bottom end is inserted to rest within the support base peripheral shoulder opening;
wherein the switching means is located to engage the container switch engaging means when the container bottom end is inserted to rest within the support base peripheral shoulder opening, the engagement of the switch engaging means to actuate the heating element to heat the container liquid to the at least one specified temperature; and
wherein said gasket is made of cork.

16. The beverage apparatus of claim 15, wherein the portable liquid container switch engaging means is an electromagnetic device; and wherein the switching means is at least one electromagnetic switch to be actuated by a proximity to the portable liquid container electromagnetic device when the portable liquid container bottom end is inserted to rest within the support base peripheral shoulder opening.

* * * * *